United States Patent
Durfee

(10) Patent No.: US 10,786,758 B2
(45) Date of Patent: Sep. 29, 2020

(54) WATER STERILIZATION SYSTEM WITH MULTIPURPOSE DEGASSER

(71) Applicant: Creatrix Solutions LLC, Kennewick, WA (US)

(72) Inventor: Eileen Durfee, Kennewick, WA (US)

(73) Assignee: Creatrix Solutions LLC, Kennewick, WA (US)

( * ) Notice: Subject to any disclaimer, the term of this patent is extended or adjusted under 35 U.S.C. 154(b) by 207 days.

(21) Appl. No.: 16/150,134

(22) Filed: Oct. 2, 2018

(65) Prior Publication Data

US 2019/0030458 A1 Jan. 31, 2019

Related U.S. Application Data

(63) Continuation-in-part of application No. 15/868,650, filed on Jan. 11, 2018, and a continuation-in-part of
(Continued)

(51) Int. Cl.
| | |
|---|---|
| *B01D 19/00* | (2006.01) |
| *C02F 1/20* | (2006.01) |
| *C02F 1/78* | (2006.01) |

(52) U.S. Cl.
CPC .......... *B01D 19/0057* (2013.01); *C02F 1/20* (2013.01); *C02F 1/78* (2013.01); *C02F 2201/002* (2013.01); *C02F 2201/78* (2013.01); *C02F 2301/024* (2013.01); *C02F 2301/026* (2013.01); *C02F 2303/04* (2013.01); *C02F 2303/18* (2013.01); *C02F 2305/023* (2013.01)

(58) Field of Classification Search
CPC .......... B01D 19/0057; C02F 1/20; C02F 1/78; C02F 2303/04; C02F 2303/18; C02F 2301/024; C02F 2305/023; C02F 2201/78; C02F 2301/026; C02F 2201/002; C02F 1/50; C02F 1/5281; C02F 1/58; A61L 2/183; A61L 2/202; A61L 2/26
See application file for complete search history.

(56) References Cited

U.S. PATENT DOCUMENTS 4,941,962 A * 7/1990 Inoue ................... B01D 53/323
204/639
4,986,906 A * 1/1991 Dadisman ............. C02F 1/4606
204/229.2
(Continued)

*Primary Examiner* — Regina M Yoo

(57) ABSTRACT

A sterilization system with multipurpose degasser has a vortex mixing cylinder, an endcap, and a deionization system. The vortex mixing cylinder is a container that has an inlet an outlet. The inlet and out enable an ozone-water mixture to flow into a mixing chamber within the vortex mixing cylinder. The mixing chamber is designed to facilitate the formation of an ozone saturated ozone-water mixture. The endcap is used to cover an opening of the mixing chamber and is used to expel gasses out of the mixing chamber. The deionization system is an electrical filter that removes ozone particles from the air within the mixing chamber. The deionization system is mounted in between the vortex mixing cylinder and the endcap. Accordingly, gasses must pass through the deionization system prior to being expelled through the endcap. The ozone particles are removed from the gasses being expelled through the endcap, prior to expulsion.

15 Claims, 6 Drawing Sheets

Related U.S. Application Data application No. 15/791,141, filed on Oct. 23, 2017, now Pat. No. 10,449,113, and a continuation-in-part of application No. PCT/IB2017/055987, filed on Sep. 28, 2017, and a continuation-in-part of application No. PCT/IB2017/055986, filed on Sep. 28, 2017, and a continuation-in-part of application No. PCT/IB2016/055124, filed as application No. PCT/IB2016/053856 on Jun. 28, 2016, and a continuation-in-part of application No. PCT/US2015/041644, filed on Jul. 23, 2015.

(60) Provisional application No. 62/567,061, filed on Oct. 2, 2017, provisional application No. 62/193,887, filed on Jul. 17, 2015, provisional application No. 62/186,650, filed on Jun. 30, 2015.

(56) References Cited

U.S. PATENT DOCUMENTS

| | | | | |
|---|---|---|---|---|
| 4,999,108 A | * | 3/1991 | Koch | B01D 17/045 |
| | | | | 210/243 |
| 5,118,410 A | * | 6/1992 | Rumberger | B01D 35/143 |
| | | | | 210/243 |
| 5,324,434 A | * | 6/1994 | Oikawa | C02F 1/46104 |
| | | | | 204/228.1 |
| 5,445,798 A | * | 8/1995 | Ikeda | A23L 3/3409 |
| | | | | 422/121 |
| 5,772,119 A | * | 6/1998 | Someya | C02F 1/003 |
| | | | | 239/315 |
| 5,888,381 A | * | 3/1999 | Primdahl | B01D 61/18 |
| | | | | 200/81.9 M |
| 5,939,030 A | * | 8/1999 | Moxley | C01B 13/11 |
| | | | | 204/176 |
| 5,997,642 A | * | 12/1999 | Solayappan | B05D 1/007 |
| | | | | 118/50 |
| 6,015,486 A | * | 1/2000 | Watanabe | B67D 1/0015 |
| | | | | 210/269 |
| 7,615,152 B2 | * | 11/2009 | Tanner | B01D 39/2058 |
| | | | | 210/257.1 |
| 7,850,859 B2 | * | 12/2010 | Tanner | B01D 39/2058 |
| | | | | 210/257.1 |
| 10,010,477 B2 | | 7/2018 | Durfee | |
| 2016/0221842 A1 | * | 8/2016 | Rau, III | C02F 1/444 |

\* cited by examiner

WATER STERILIZATION SYSTEM WITH MULTIPURPOSE DEGASSER

The current application claims a priority to the U.S. Provisional Patent application Ser. No. 62/567,061 filed on Oct. 2, 2017.

FIELD OF THE INVENTION

The present invention generally relates to water sterilization system. More specifically, the present invention is a multipurpose degassing system that allows for more efficient and safer ozone degassing.

BACKGROUND OF THE INVENTION

Water is arguably the most precious natural resource in the world. Besides the direct need of human consumption, water is the lifeblood of basic human needs. Even if planet Earth is covered with about seventy percent of water, only around three percent of it is suitable for human consumption. Furthermore, even the limited percentage of water that is fit for human consumption, must be filtered and purified extensively, to ensure any potential harmful elements are thoroughly removed. Currently available technologies provide numerous options for water filtration. As an example, chlorine is widely used across the United States and throughout the world, due to its ability to kill bacteria and provide algae control. However, chlorine has a pungent lingering smell, and it is not suitable for certain applications, where people may be sensitive to it, such as hospitals and restaurants. Some of the most commonly used devices require the addition of chemicals or highly complex filtration systems to remove unwanted bacteria and particles from the liquid. While these types of filters are common in industrial application, when it comes to personal residential use, homeowners are limited to commercially available filters. Ozone is an alternative to the common chemicals used in filtration for potable water systems, and due to its versatility, it can be added at various points during the water purification and enriching process.

Ozone is a powerful oxidant gas that has numerous uses in various industrial or consumer grade applications if used correctly. It has been proven as a very effective disinfectant, and as a cost-effective alternative to traditional sanitizing systems. Ozonation is the process with which water is treated with ozone gas. One of the major issues that arises during this process is undissolved ozone gas remains in the water piping after the process is complete. Undissolved ozone gas escapes into the air and can be hazardous to human health even in low concentration. Prolonged exposure can negatively affect the eyes, the respiratory system, and the overall general wellbeing. Degassing the excess undissolved gas from the system is a critical step in the ozone injection process. Degasser and diffuser systems are complex, costly, and challenging to implement in consumer grade applications.

Ozonating water can be completed in a variety of ways, either through diffusers or direct venturi injection. Regardless of the methods through which ozone is injected into water, the resulting mixture must be degassed before use. The present invention aims to solve some of the problems associated with the degassing process, by disclosing a system that may be used on any water line, either for residential or commercial applications. The present invention is designed to work in conjunction with virtually any ozonation system to further expand the usability of such devices.

Ozone treated water is used in a wide array of applications, including but not limited to municipal water treatment plants, agriculture, food processing, medical applications, HVAC systems, and surface sanitation. Virtually any application where sterilization is required can be accomplished with ozonated water. As an example, the food industry implements strict rules when it comes to food safety regulations. To prevent cross contamination, restaurants are required to adhere to the rules imposed by the Food and Drug Administration. Antimicrobial cleaners are commonly used to sterilize surfaces in kitchens; however, it has been proven that harmful microorganisms become increasingly resistant to such substances, creating superbugs that cause antibiotic resistant infections which can be very difficult to treat. Ozonated water can help prevent the spread of bacteria and pathogens, by sterilizing surfaces on contact. For example, fresh produce may be washed using ozonated water thus eliminating the risk for contamination with bacteria such as *E. coli, Listeria*, and *salmonella*. Furthermore, the present invention may be used in agricultural application, allowing farmers to spray crops with ozonated water which in turn can eliminate pests through cell lysing of insect larvae.

DETAIL DESCRIPTIONS OF THE INVENTION

All illustrations of the drawings are for the purpose of describing selected versions of the present invention and are not intended to limit the scope of the present invention.

Referring to FIG. 1 through FIG. 6, the present invention, the water sterilization system with multipurpose degasser, is a device that is designed to thoroughly mix ozone and water while removing any excess ozone gas. The present invention is designed to be used in conjunction with ozone injection systems, or as a standalone ozone-water mixing device. Specifically, the present invention is designed to function as a mixing filter through which a stream of ozone and water flows. To achieve the above-described functionality, the present invention comprises a vortex mixing cylinder 1, an endcap 2 and a deionization system 3. The vortex mixing cylinder 1 is designed to ensure a homogeneous ozone-water mixture is achieved. The deionization system 3 is an electrical filter that removes undissolved ozone gas from the air exiting the vortex mixing cylinder 1. As a result, the present invention is able to produce an ozone-water mixture without contaminating the external environment with excessive amounts of ozone.

Figure 1:
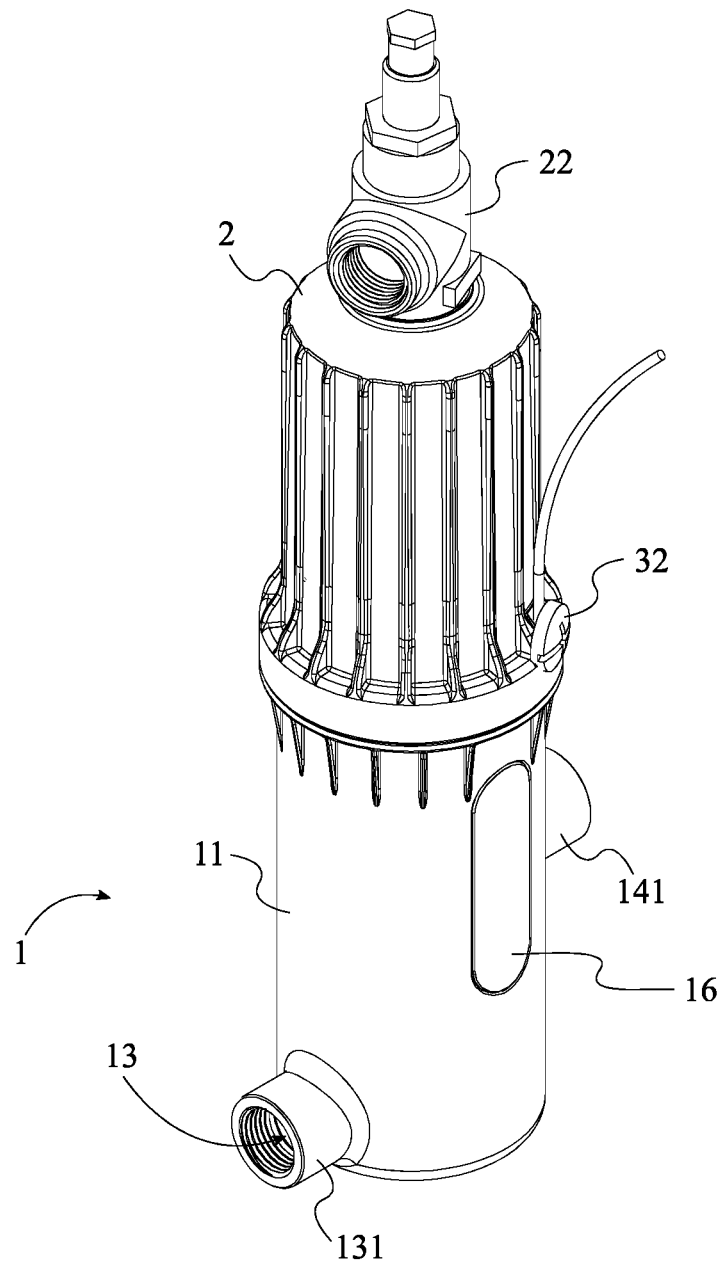
FIG. 1 is a top perspective view of the present invention.
Figure 2:
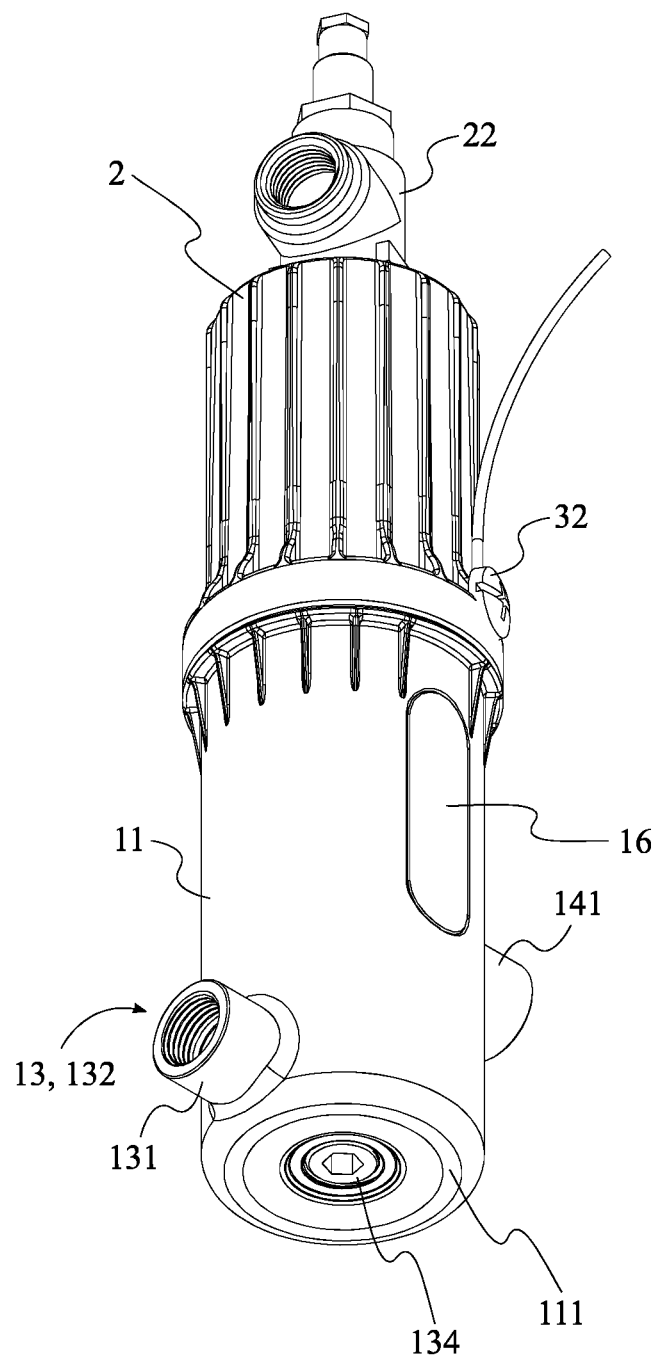
FIG. 2 is a bottom perspective view of the present invention.
Figure 4:
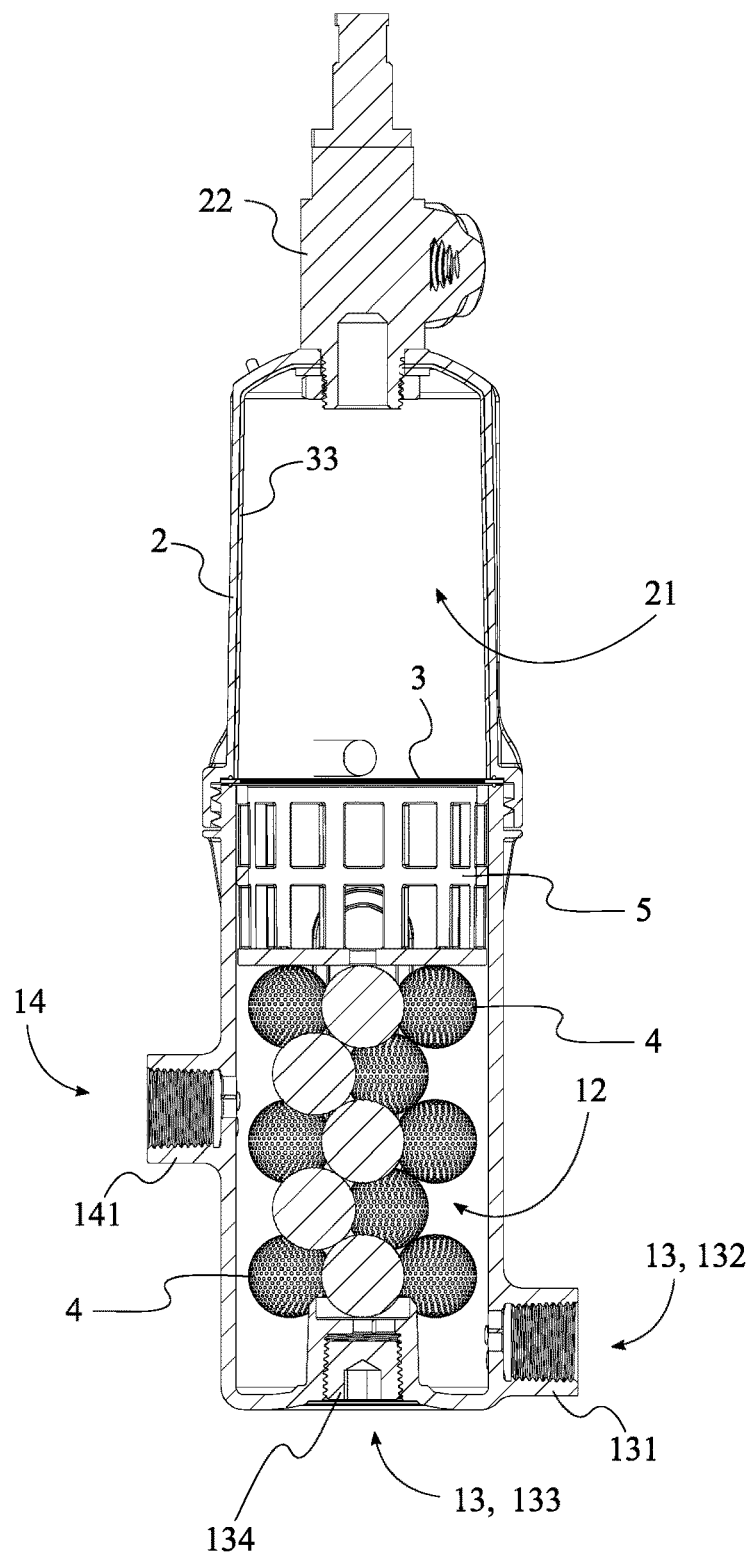
FIG. 4 is a left-side sectional view of the present invention taken along line 4-4 in FIG. 3.

Referring to FIG. 1 and FIG. 4, the vortex mixing cylinder 1 is a container that facilitates forming a more homogeneous mixture from the stream of ozone and water. To that end, the vortex mixing cylinder 1 comprises a cylinder body 11, a mixing chamber 12, at least one inlet 13, and at least one outlet 14. The cylinder body 11 is a rigid cylindrically shaped member that forms the structural foundation of the vortex mixing cylinder 1. While the present invention is described as having a cylindrical shape, various other shapes and configurations may be used without departing from the scope or spirit of the invention. The mixing chamber 12 longitudinally traverses into the cylinder body 11 so that the vortex mixing cylinder 1 is able to function as a container in which ozone and water are mixed. The inlet 13 is integrated into the cylinder body 11. Likewise, the outlet 14 is integrated into the cylinder body 11. Additionally, the outlet 14 is positioned offset from the inlet 13 along the cylinder body 11. Further, the outlet 14 and the inlet 13 are in fluid communication with the mixing chamber 12. As a result, external fluid transfer lines can be connected to the present invention. Specifically, the ozone-water mixture flows into the mixing chamber 12 through the inlet 13. The ozone-water mixture flows out of the mixing chamber 12 through the outlet 14. The outlet 14 is positioned offset from the inlet 13 to ensure the ozone-water mixture is formed into a more homogenous mixture while flowing through the mixing chamber 12.

Figure 5:
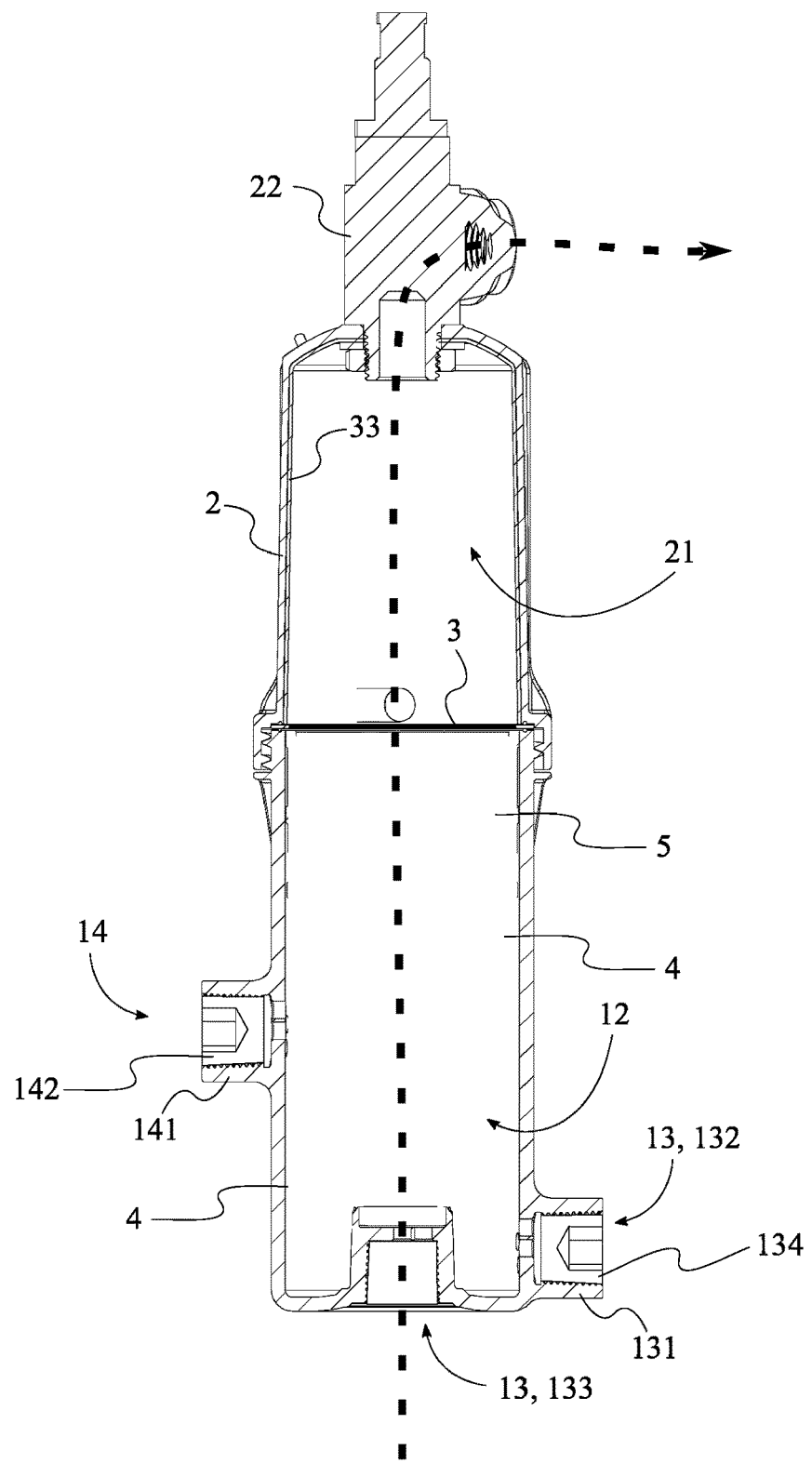
FIG. 5 is a left-side sectional view of the present invention showing the flow of gas through the vortex mixing cylinder, the deionization system the endcap and the relief valve. This flow pattern occurs when the outlet and one of the inlets is plugged.

Referring to FIG. 1 and FIG. 5, the endcap 2 is a multipurpose component that is designed to seal one end of the mixing chamber 12. Specifically, the endcap 2 is mounted over an opening 15 of the mixing chamber 12. Accordingly, the inlet 13 and the outlet 14 form the primary means by which the ozone-water mixture can enter or exit the mixing chamber 12. The deionization system 3 is mounted in between the cylinder body 11 and the endcap 2. Consequently, the deionization system 3 is able to remove any excess ozone gas that is within the mixing chamber 12, yet undissolved into the water flowing through the mixing chamber 12.

Figure 3:
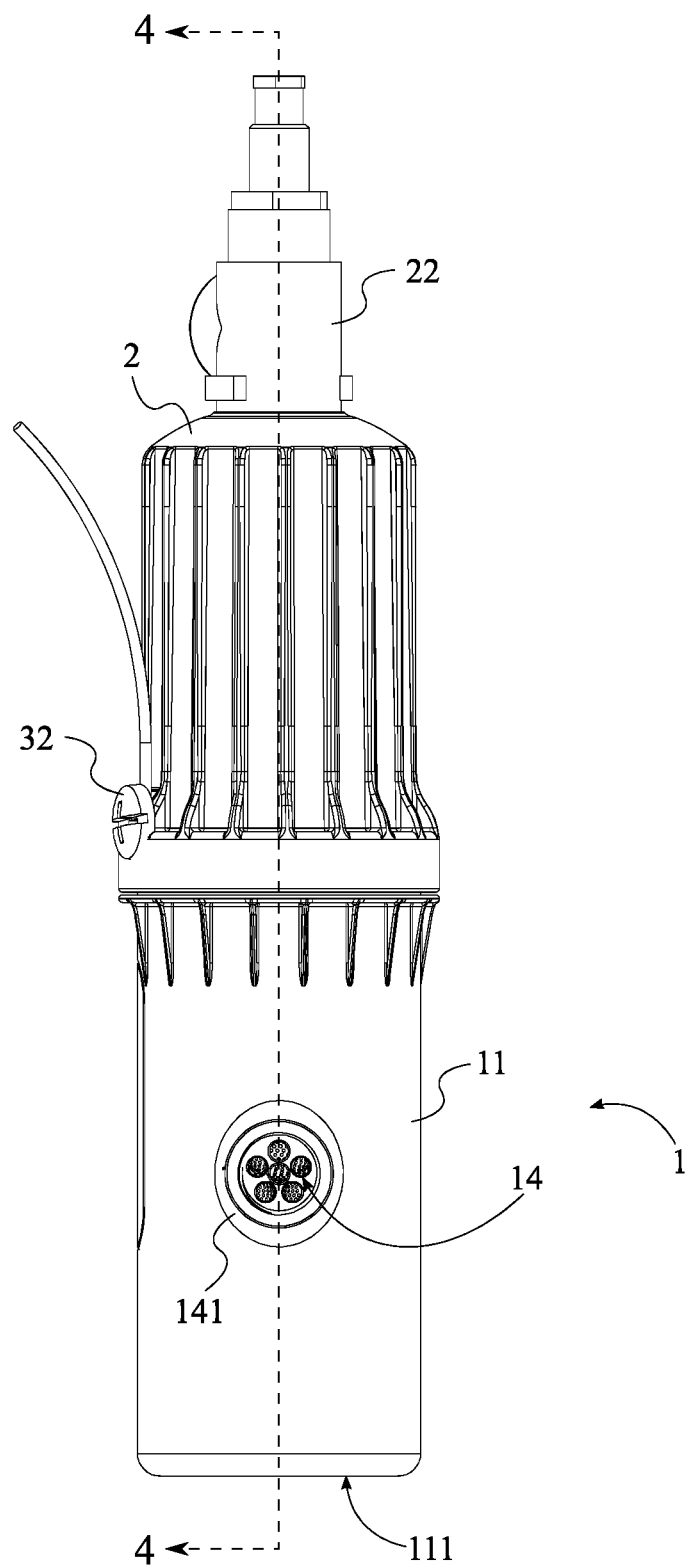
FIG. 3 is a rear view of the present invention.
Figure 6:
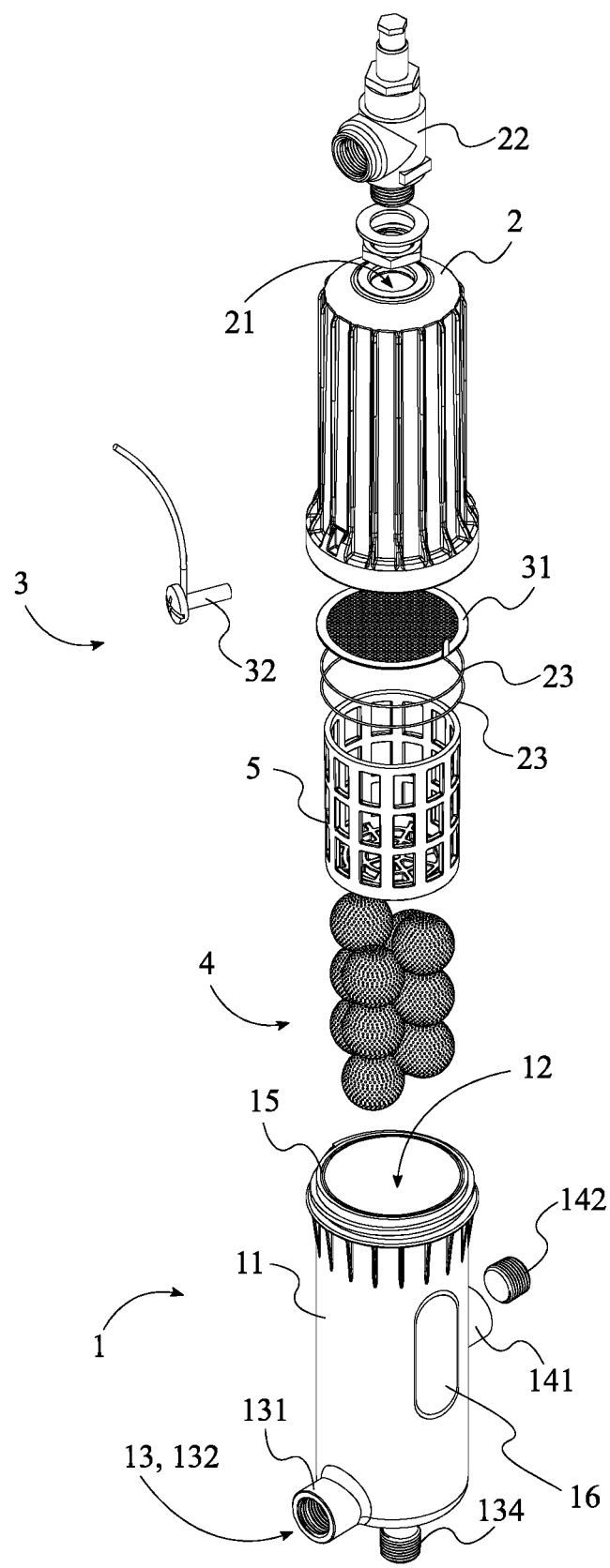
FIG. 6 is an exploded perspective view of the present invention.

Referring to FIG. 3 and FIG. 6, the present invention designed to facilitate the formation of a homogeneous ozone-water mixture. To that end, the present invention further comprises a plurality of mixing elements 4. Preferably, each of the plurality of mixing elements 4 is a textured sphere composed of nonconductive materials. However, the plurality of mixing elements 4 may consist of any collection of materials or devices that is used to generate a desirable current within the mixing chamber 12. As such, the plurality of mixing elements 4 is mounted within the mixing chamber 12. Thus positioned, the plurality of mixing elements 4 generates a turbulent current within the ozone-water mixture that flows through the mixing chamber 12. Preferable each of the textured spheres 4 is covered in a plurality of identical and evenly spaced dimples. These dimples facilitate the formation of an ozone saturated mixture within the mixing chamber 12. The present invention further comprises a vortex-inducing basket 5. The vortex-inducing basket 5 is a non-conductive basket with a plurality of holes and channels. The plurality of holes and channels induces a vortex within the ozone-water mixture flowing through the mixing chamber 12. The vortex-inducing basket 5 is mounted within the mixing chamber 12. Additionally, the plurality of mixing elements 4 is positioned in between a base 111 of the cylinder body 11 and the vortex-inducing basket 5. As a result, the vortex-inducing basket 5 causes the plurality of mixing elements 4 to remain bunched within one section of the mixing chamber 12. Further, the vortex-inducing basket 5 is designed to be mounted below the surface of the ozone-water mixture that is contained within the mixing chamber 12. Thus positioned, the plurality of mixing elements 4 and the vortex-inducing basket 5 work in concert to induce desirable currents within the mixing chamber 12, facilitating the formation of a homogeneous, and ozone saturated, ozone-water mixture.

Referring to FIG. 2 through FIG. 5, as described above, the present invention is designed to be attached to external fluid transfer lines. To that end, the present invention comprises an inlet coupling mechanism 131 and an outlet coupling mechanism 141. The inlet coupling mechanism 131 and the outlet coupling mechanism 141 are preferably threaded connectors that enable the external fluid transfer lines to be attached to the vortex mixing cylinder 1. Specifically, the inlet coupling mechanism 131 is mounted over the inlet 13 and positioned external to the mixing chamber 12. Similarly, the outlet coupling mechanism 141 is mounted over the outlet 14 and positioned external to the mixing chamber 12. Accordingly, the external fluid transfer lines are retained in fluid communication with the inlet 13 and the outlet 14 through the inlet coupling mechanism 131 and the outlet coupling mechanism 141, respectively. The outlet 14 is positioned below the surface of the ozone-water mixture within the mixing chamber 12 so that the circulation of the ozone-water mixture through the mixing chamber 12 is directed from the inlet 13 toward the outlet 14. In some embodiments of the present invention the at least one inlet 13 comprises a first inlet 132 and a second inlet 133. The first inlet 132 is laterally integrated into the cylinder body 11 and the second inlet 133 is integrated into the base 111 of the cylinder body 11. Thus positioned, the first inlet 132 and the second inlet 133 facilitate the homogeneous mixing of multiple streams of fluid within the mixing chamber 12.

Referring to FIG. 4 and FIG. 5, the present invention is primarily designed to facilitate the formation of a homogeneous, and ozone saturated, ozone-water mixture. However, the present invention can be adapted for use with various other gasses and fluids. Additionally, the present invention is designed to be used as a degassing system that simply filters ozone molecules out of a stream of air that passes though the vortex mixing cylinder 1 and the endcap 2. To facilitate this, the vortex-inducing basket 5 and the plurality of mixing elements 4 can be removed from the mixing chamber 12. Additionally, a valve is integrated into the endcap 2 so that the stream of air is able to exit the present invention undisturbed. The stream of air that enters the mixing chamber 12 through the second inlet 133, traverses the deionization system 3 where the ozone particles are removed before. The stream of air then exits the endcap 2 through the valve. To facilitate this, the present invention further comprises at least one inlet plug 134 and at least one outlet plug 142. The inlet plug 134 seals the first inlet 132, and the outlet plug 142 seals the outlet 14. Accordingly, the inlet plug 134 and the outlet plug 142 prevent gasses or fluids from passing through the first inlet 132 or the outlet 14. With the first inlet 132 and the outlet 14 plugged, the second inlet 133 and the valve can be connected to external fluid transfer lines. Thus connected, the stream of air enters the present invention through the second inlet 133 and exits the present invention through the valve. The inlet plug 134 can be interchangeably engaged into the first inlet 132 or the second inlet 133. Accordingly, the user is able to modify the pathway taken by gases or fluids traveling through the mixing chamber.

Referring to FIG. 1, FIG. 4 and FIG. 6, the deionization system 3 is designed to remove ozone gas that has not been dissolved into the ozone-water mixture within the mixing chamber 12. To accomplish this, the deionization system 3 comprises a conductive mesh 31 and an electrical coupling terminal 32. The conductive mesh 31 is mounted over the opening 15. Accordingly, undissolved ozone gas within the mixing chamber 12 is able to move through the conductive mesh 31. The electrical coupling terminal 32 is mounted onto the endcap 2 so that the present invention can be electrically connected to external systems. Additionally, the electrical coupling terminal 32 is electrically connected to the conductive mesh 31. Thus connected, the conductive mesh 31 is able to act as an electrical filter that separates the undissolved ozone gas within the mixing chamber 12 from the ambient air within the mixing chamber 12. Specifically, the external system delivers a positive electrical charge to the electrical coupling terminal 32. This charge is delivered to the conductive mesh 31 which then attracts the negatively charged ozone molecules. Thus, filtering out the harmful ozone particles. Preferably the deionization system 3 is electrically isolated from the ozone-water mixture. Alternatively, the deionization can be supplied with a positive, or alternating current as required. Embodiments of the deionization system 3 include integrated sensors and control systems that enable the external system to monitor the environment within mixing chamber 12. For example, the deionization system 3 can be used to monitor the amount of undissolved ozone gas within the mixing chamber 12 and adjust the filtering rate of the conductive mesh 31 accordingly.

Referring to FIG. 1, FIG. 4 and FIG. 6, the present invention is designed with a safety system that prevents the mixing chamber 12 from becoming over pressurized. Specifically, the present invention further comprises a transfer chamber 21, a relief valve 22, and a conductive liner 33. The transfer chamber 21 longitudinally traverses into the endcap 2 so that the transfer chamber 21 forms a cavity into which the undissolved ozone gas flows. The relief valve 22 is mounted onto the endcap 2, opposite to the vortex mixing cylinder 1. Additionally, the relief valve 22 is in fluid communication with the transfer chamber 21. As a result, the relief valve 22 is able to be opened when the pressure within the mixing chamber 12 exceeds a desired threshold. Specifically, undissolved gases within the mixing chamber 12 are released into the transfer chamber 21 and then exit the endcap 2 through the relief valve 22. The conductive liner 33 is designed to bolster the ozone-extracting properties of the deionization system 3. To that end, the conductive liner 33 is superimposed onto the transfer chamber 21. Additionally, the conductive liner 33 is electrically connected to the deionization system 3. Consequently, the conductive liner 33 can be positively or negatively charged by the deionization system 3 and exert an attractive force on any undissolved gas that passes through the conductive mesh 31. Preferably, the conductive liner 33 is detachably mounted within the transfer chamber 21. Thus mounted, the conductive liner 33 can be removed or replaced as desired. The present invention further comprises at least one gasket 23. The gasket 23 is mounted in between the endcap 2 and the vortex mixing cylinder 1. Accordingly, the gasket 23 enables the endcap 2 to form an airtight seal over the opening 15 of the mixing chamber 12. The present invention further comprises at least one window 16. The window 16 is laterally integrated into the cylinder body 11. Additionally, the window 16 is optically coupled to the mixing chamber 12. Thus, the window 16 enables a user to visually inspect the interior of the mixing chamber 12 while the endcap 2 is mounted onto the vortex mixing cylinder 1.

Although the invention has been explained in relation to its preferred embodiment, it is to be understood that many other possible modifications and variations can be made without departing from the spirit and scope of the invention as hereinafter claimed.

What is claimed is:

1. A water sterilization system comprising:
a vortex mixing cylinder;
an endcap; and
a deionization system;
wherein the vortex mixing cylinder comprises a cylinder body, a mixing chamber, at least one inlet, and at least one outlet;
the mixing chamber longitudinally traversing into the cylinder body;
the at least one inlet integrated into the cylinder body;
the at least one outlet integrated into the cylinder body;
the at least one outlet positioned offset from the at least one inlet along the cylinder body;
the at least one outlet and the at least one inlet are in fluid communication with the mixing chamber;
the endcap is mounted over an opening of the mixing chamber; and
the deionization system is mounted in between the cylinder body and the endcap.

2. The water sterilization system as claimed in claim 1 comprising:
a plurality of mixing elements;
wherein the plurality of mixing elements are mounted within the mixing chamber.

3. The water sterilization system as claimed in claim 2, wherein each of the plurality of mixing elements is a textured sphere.

4. The water sterilization system as claimed in claim 2, wherein each of the plurality of mixing elements is composed of non-conductive materials.

5. The water sterilization system as claimed in claim 2 comprising:
a vortex-inducing basket;
wherein the vortex-inducing basket is mounted within the mixing chamber; and
the plurality of mixing elements are positioned in between a base of the cylinder body and the vortex-inducing basket.

6. The water sterilization system as claimed in claim 5, wherein the vortex inducing basket is composed of non-conductive materials.

7. The water sterilization system as claimed in claim 1 comprising:
an inlet coupling mechanism;
wherein the inlet coupling mechanism is mounted over the at least one inlet.

8. The water sterilization system as claimed in claim 1 comprising:
an outlet coupling mechanism;
wherein the outlet coupling mechanism is mounted over the at least one outlet.

9. The water sterilization system as claimed in claim 1, wherein the at least one inlet comprises a first inlet and a second inlet;
wherein the first inlet is laterally integrated into the cylinder body; and
the second inlet being integrated into a base of the cylinder body.

10. The water sterilization system as claimed in claim 9 comprising:
at least one inlet plug; and
at least one outlet plug;
wherein the at least one inlet plug sealing the first inlet; and
the at least one outlet plug sealing the at least one outlet.

11. The water sterilization system as claimed in claim 1,
wherein the deionization system comprising a conductive mesh and an electrical coupling terminal;
wherein the conductive mesh is mounted across the opening of the mixing chamber;
the electrical coupling terminal is mounted onto the endcap; and
the electrical coupling terminal is electrically connected to the conductive mesh.

12. The water sterilization system as claimed in claim 1 comprising:
a transfer chamber; and
a relief valve;
wherein the transfer chamber longitudinally traversing into the endcap;
the relief valve is mounted onto the endcap, opposite to the vortex mixing cylinder; and
the relief valve is in fluid communication with the transfer chamber.

13. The water sterilization system as claimed in claim 12 comprising:
a conductive liner;
wherein the conductive liner being superimposed onto the transfer chamber; and
the conductive liner is electrically connected to the deionization system.

14. The water sterilization system as claimed in claim 1 comprising:
at least one gasket;
wherein the at least one gasket is mounted in between the endcap and the vortex mixing cylinder.

15. The water sterilization system as claimed in claim 1 comprising:
at least one window;
wherein the at least one window is laterally integrated into the cylinder body; and
the at least one window is optically coupled to the mixing chamber.

* * * * *